US010960604B2

(12) United States Patent
Miles

(10) Patent No.: US 10,960,604 B2
(45) Date of Patent: Mar. 30, 2021

(54) INDICATORS

(71) Applicant: Hewlett-Packard Development Company, L.P., Houston, TX (US)

(72) Inventor: Michael Duffield Miles, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 311 days.

(21) Appl. No.: 15/759,349

(22) PCT Filed: Dec. 4, 2015

(86) PCT No.: PCT/US2015/064078
§ 371 (c)(1),
(2) Date: Mar. 12, 2018

(87) PCT Pub. No.: WO2017/095446
PCT Pub. Date: Jun. 8, 2017

(65) Prior Publication Data
US 2018/0257298 A1 Sep. 13, 2018

(51) Int. Cl.
*B65H 7/04* (2006.01)
*B65H 1/26* (2006.01)
*B29C 64/245* (2017.01)
*B65H 1/04* (2006.01)
*B41J 13/10* (2006.01)
*B41J 11/00* (2006.01)
*B33Y 30/00* (2015.01)
(Continued)

(52) U.S. Cl.
CPC ............ *B29C 64/245* (2017.08); *B33Y 30/00* (2014.12); *B41J 11/0075* (2013.01); *B41J 13/10* (2013.01); *B41J 13/103* (2013.01);

*B65H 1/04* (2013.01); *B65H 1/08* (2013.01); *B65H 1/266* (2013.01); *B65H 7/04* (2013.01); *G03G 15/6502* (2013.01); *B65H 2511/20* (2013.01); *B65H 2551/23* (2013.01); *B65H 2553/612* (2013.01)

(58) Field of Classification Search
CPC . B65H 7/04; B65H 1/266; B65H 1/12; B65H 1/14; B65H 1/18; B65H 1/04; B65H 2511/152; B65H 2551/23; B65H 2511/214; B65H 2511/30
See application file for complete search history.

(56) References Cited

U.S. PATENT DOCUMENTS 4,566,547 A 1/1986 Furukawa
5,236,348 A 8/1993 Fetherolf et al.
(Continued)

FOREIGN PATENT DOCUMENTS

JP 215529 8/1995
JP 10245139 A * 9/1998
(Continued)

*Primary Examiner* — Luis A Gonzalez
(74) *Attorney, Agent, or Firm* — HP Inc. Patent Department

(57) ABSTRACT

In an example, an indicator may comprise an arm pivotally disposed within a media tray, an indicator plate movably coupled to the media tray, and a latch engaged with the arm and the indicator plate. The media tray may receive print media. The latch may support the indicator plate in a raised position, and the latch may release the indicator plate to a lowered position upon the arm pivoting the latch from a latched position to a released position.

14 Claims, 6 Drawing Sheets

(51) Int. Cl.
*B65H 1/08* (2006.01)
*G03G 15/00* (2006.01)

(56) References Cited

U.S. PATENT DOCUMENTS

| | | |
|---|---|---|
| 6,252,654 B1 | 6/2001 | Kaya |
| 6,247,695 B1 | 9/2001 | Linder et al. |
| 8,393,613 B2 | 3/2013 | Chen |
| 2008/0143773 A1 | 6/2008 | Chelvayohan et al. |
| 2013/0001871 A1 | 1/2013 | Chen |
| 2013/0161899 A1 | 6/2013 | Ito et al. |
| 2015/0239265 A1 | 8/2015 | Lo et al. |
| 2017/0003635 A1* | 1/2017 | Koga ................ B65H 1/08 |
| 2019/0077620 A1* | 3/2019 | Lo ..................... B65H 1/266 |

FOREIGN PATENT DOCUMENTS

| | | | |
|---|---|---|---|
| JP | 2007191264 A | * | 8/2007 |
| JP | 2008133061 A | * | 6/2008 |

\* cited by examiner

INDICATORS

BACKGROUND

Printing systems may deposit printing fluid, such as ink, or another printing substance, such as three-dimensional printing powder, on print media. The print media may be stored in a media tray, from which the printing system may draw a sheet or portion of the print media for printing. The supply of print media within the media tray may be periodically filled or replaced when the supply reaches a certain level, or is depleted. The media tray may include an indicator to inform a user of the level of the print media remaining within the media tray.

DETAILED DESCRIPTION

Figure 1A:
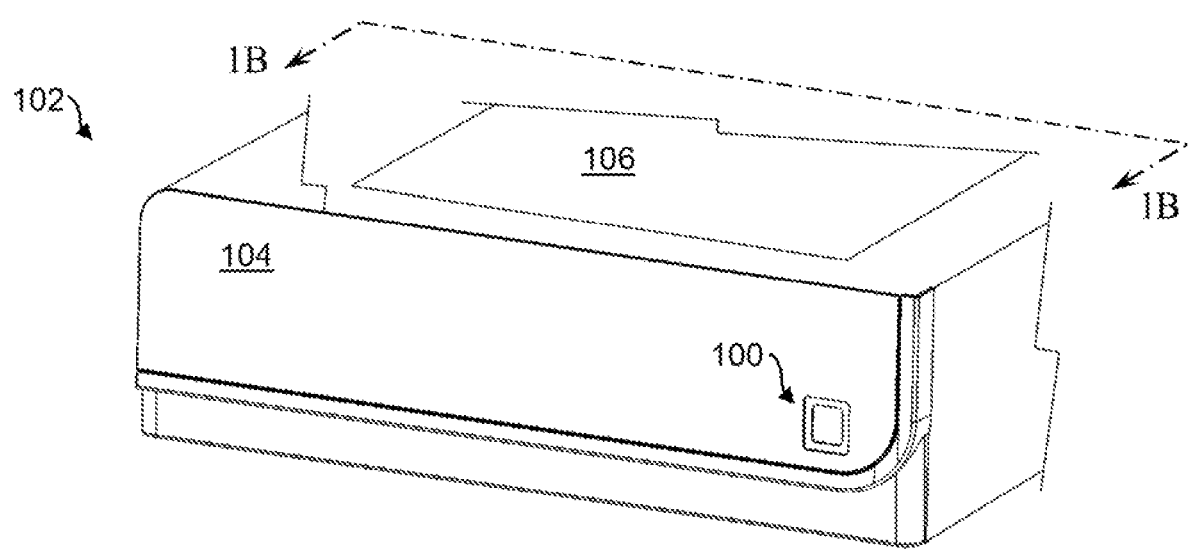
FIG. 1A is a perspective view of an example indicator.

Printing systems may deposit printing fluid, such as ink, for example, on media or print media. In some situations, printing systems may deposit other print substances on media, such as powder, for example, in a powder-based three-dimensional (3D) printer. The print media may be stored in a media tray, from which the printing system limy draw a sheet or portion of the print media for printing. In some situations, the print media may be stored, a stack within the media tray. Additionally, in some situations printing systems may have more than one media tray for storing multiple types or sizes of print media. Each of the media trays may have an external designation, shape, character, or other element to uniquely identify that particular tray to a user. The supply of print media within each media tray may be periodically filled or replaced when the supply reaches a certain level, or the supply is depleted.

In some situations, it may be desirable for the media tray to include an indicator to inform a user of the level or quantity of the print media left within the media tray. It may further be desirable that the indicator be an external alert, or, in other words, be visible to a user from the exterior of the media tray, or the printing system. Such an external indicator may be a continuous indicator, in some situations. A continuous indicator may be graduated, or continuously follow the current level or quantity of the print media within the media tray and display such a quantity or level to an external user of the printing system. In some situations, interpreting a continuous indicator may be difficult or confusing. A graduated or continuous indicator may be subject to a user's interpretation, and multiple users using the same printing system may have different interpretations of the level of print media tell in the media tray based on any given external display of a continuous indicator. For example, a continuous print media indicator may, to some users, appear to indicate that the media tray needs to be refilled. To other users, however, the continuous indicator may indicate that a sufficient quantity of print media remains in the tray and it does not need to be refilled.

Implementations of the present disclosure provide an indicator for a media tray of a printing system. In some implementations, the indicator may be a binary indicator, or, in other words, may only have two indicator positions and may operate in an ON/OFF fashion, with no intermediate position. The indicator may provide an external indication to a user of the printing system that additional print media should be loaded into the media tray. Further, the external indication by the indicator of the level of print media left within the media tray ray not be subject to different interpretations by different users of the printing system. An example indicator may provide only one of two different indications at a time. A first indication may inform a user that the media tray still has a sufficient quantity of print media remaining within. The second indication may inform a user that the media tray needs additional print media to be loaded within. Any user of the printing system may be able to look to the example indicator of the media tray and see one of the two possible print media level indications and know whether the tray needs to be loaded or not.

Referring now to FIG. 1A, a perspective vim of an example indicator 100 disposed within a media tray 102 of a printing system is illustrated. The media tray 102 may include an external portion 104. The external portion 104, in some implementations, may be an exterior panel or all of the media tray 102. Additionally, the outside surface of the external portion 104 may be visible to a user of the printing system, and in some situations, comprise an indicator window. Further, the media tray 102 may receive print media 106 within the media tray 102. The print media 106, in some implementations, may comprise multiple sheets paper. The printing system may draw the multiple sheets of paper from the media tray for printing. In some implementations, the printing system may draw a single sheet of paper from the stack of print media 106 at a time. In other implementations, the print media 106 may be powder use in a 3D printing system. The powder may be disposed within a media tray 102 that may support the powder and a three-dimensional object ask is being printed. The print media 106, in further implementations, may be supported by a lift plate within the media tray 102. The lift plate, in some implementations, may be biased in an upward direction, such that the lift plate constantly pushes the print media towards a pick element, roller, or portion of the printing system, wherein the pick element or portion is to draw a sheet of print media 106 from the print media 106 stack. The lift plate may be disposed at continuously different heights within the media tray 102, depending on the quantity of print media 106 in the tray 102. For example, a full stack of print media 106 may push the lift plate further down into the media tray 102 than half a stack of print media 106. Thus, the lift plate may move further in the upward direction, as each sheet of print media 106 is removed by the pick element, roller, or portion from the stack of print media 106.

Figure 1B:
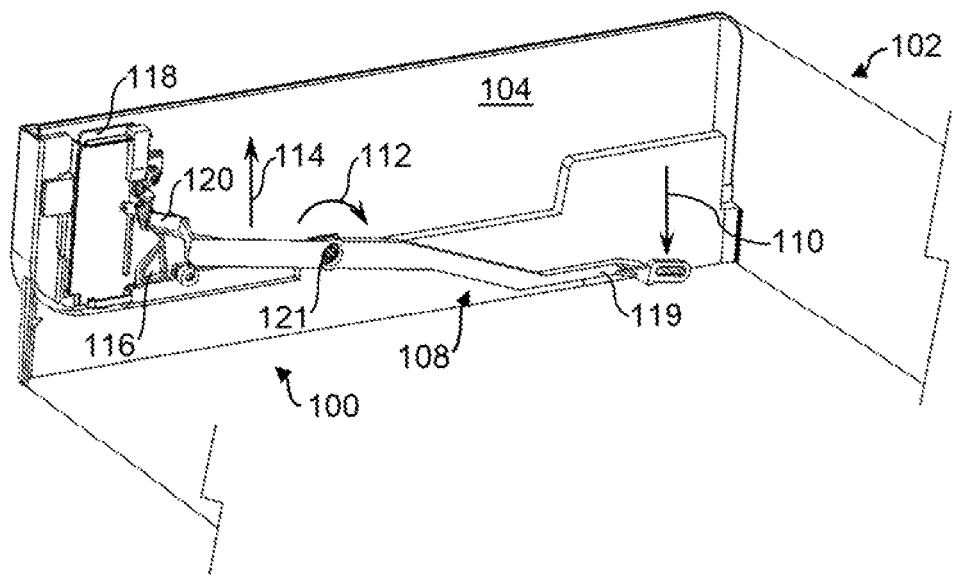
FIG. 1B is a perspective view of an example indicator.

Referring now to FIG. 1B, a perspective view of an example indicator 100 disposed within a media tray 102 is illustrated, as taken along view line 1B-1B of FIG. 1A. The example indicator 100 may comprise an arm 108, a latch 116, and an indicator plate 118, in some implementations. The arm 108 may be a rigid strut or beam having a first end 119 and a second end 120, in some implementations. The arm 108 may be pivotally engaged with the media tray 102, or a lift plate within the media tray 102. The arm 108 may be pivotally disposed within the media tray 102, and compromise a pivot 121 disposed longitudinally along the length of the arm 108 in between the first end 119 and the second end 120. The pivot 121 may be disposed on the arm 108 such that, if the first end 119 were to move in a first direction, for example, a downward direction 110, the arm 108 would rotate in a corresponding direction 112 about the pivot 121, and the second end 120 may move in a direction opposite to the downward direction 110, such as an upward direction 114. Similarly, if the first end 119 were to move in an upward direction, the arm 108 may rotate about the pivot 121 in a corresponding direction, and the second end 120 may move in a direction opposite to the direction of movement of the first end 119.

The arm 108 may be pivotally engaged with the print media 106 itself within the media tray 102, or, in some implementations, with a lift plate supporting the print media 106 within the media tray 102. The arm 108 may be coupled to or engaged with the lift plate such that the first end 119 of the arm 108 travels with the lift plate, or in a corresponding manner as the lift plate. In other words, for example, print media 106 may push the lift plate in a downward direction upon being loaded into the media tray 102, or upon the media tray 102 otherwise receiving the print media 106. The lift plate may concurrently move the first end 119 of the arm 108 in a corresponding downward direction 110. Further, as print media 106 is removed from the media tray 102, the lilt plate may move either incrementally or continuously in an upward direction, thereby also causing the first end 119 of the arm 108 to move in a corresponding upward direction. Note, the first end 119 of the arm 108 may be directly engaged with the print media 106 in some implementations, instead of with a lift plate. Thus, in such an implementation, the print media 106 may directly push the first end 119 of the arm 108 in a downward direction upon being loaded into the media tray 102, and the first end 119 of the aim 108 may move in an opposite, upward direction upon print media 106 being removed from the media tray 102. In some implementations, the first end 119 of the arm 108 may be directly biased in an upward direction such that the first end 119 pushes the print media 106 in the upward direction upon print media 106 being removed from the stack of print media 106 within the media tray 102.

Figure 1C:
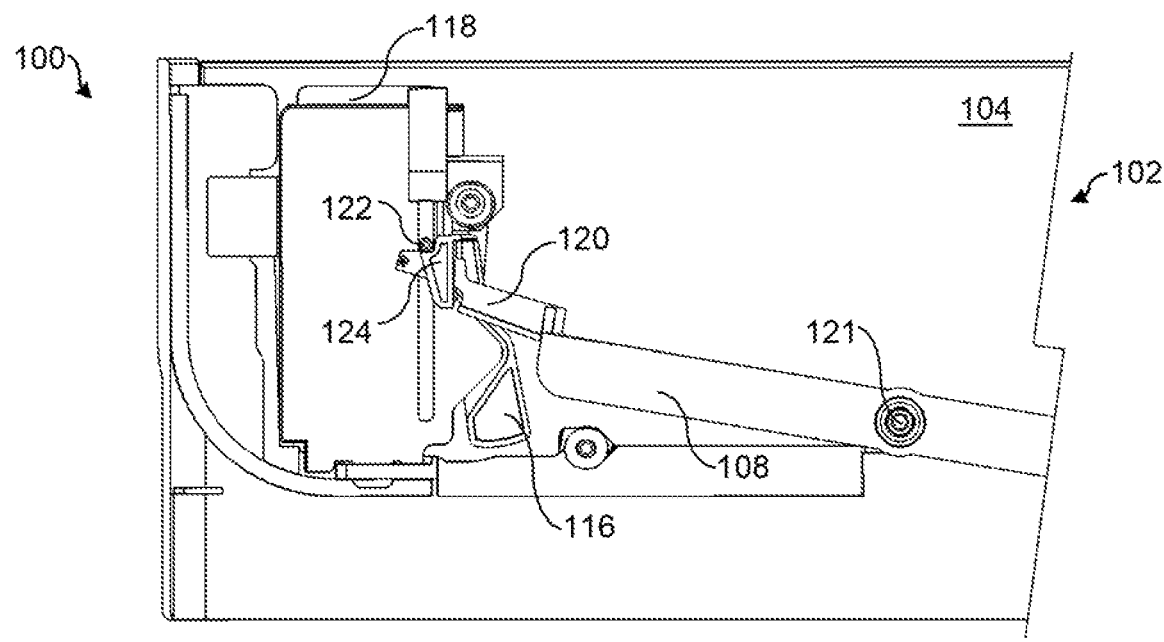
FIG. 1C is a partial back view of an example indicator.
Figure 1D:
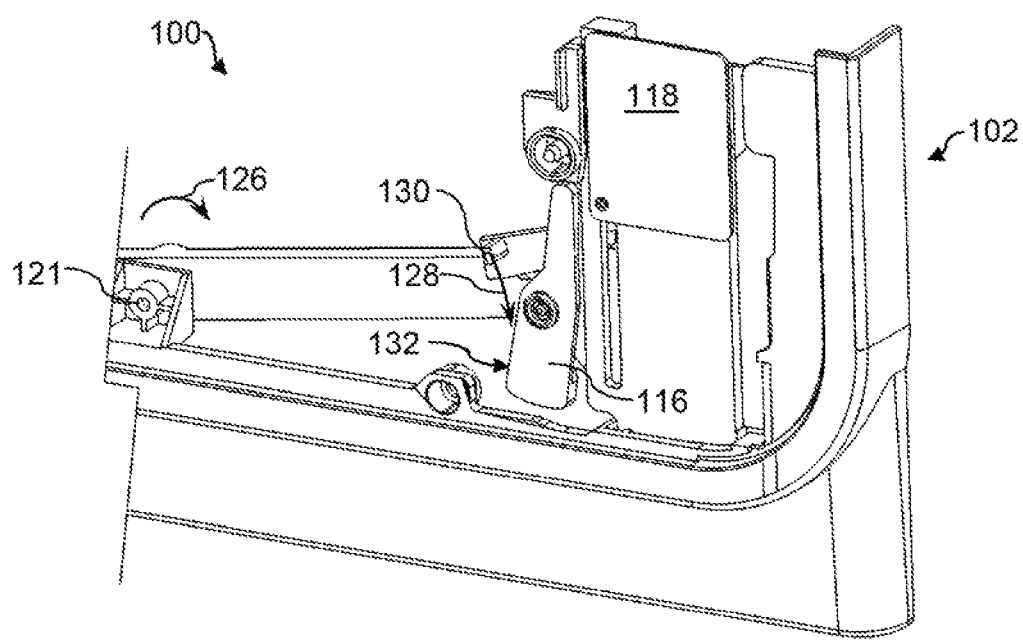
FIG. 1D is a partial perspective front view of an example indicator.

Referring now to FIG. 1C, a partial back view of an example indicator 100 is illustrated. Referring additionally to FIG. 1D, a partial perspective front view of the example indicator 100 is illustrated. The example indicator 100 may comprise a latch 116 and an indicator plate 118. The indicator plate may be a movable component relative to the meal tray 102, and comprise a latch post 122. The indicator plate 118 may be movably coupled to the media tray 102, or, in some implementations, the indicator plate 118 may be disposed within, and therefore movable within, a track, slot, or other orifice or aperture in the media tray 102. Further, in some implementations, the indicator plate 118 may be switchably disposed in one of a raised position and a lowered position. In some implementations, the indicator plate 118 may be slidably coupled to or engaged with the media tray 102 such that the indicator plate 118 may slide from the raised position to the lowered position, and vice versa. In further implementations, the indicator plate 118 may be slidably engaged with an exterior panel 104 of the media tray 102. The indicator plate 118 tray be coupled to or engaged with the exterior panel 104 of the media tray 102 such that, when disposed in the lowered position, a portion or all of the indicator plate 118 may be visible to the exterior of the media tray 102 or the printing system. In further implementations, the indicator plate 118 may comprise a color, at least in part, other than the same or a similar color as the exterior of the media tray 102 or the printing system. In yet further implementations, the indicator plate 118 may comprise a color that contrasts with the exterior color of the media tray 102 or the printing system, so that the contrasting colors increase the visibility of the indicator plate 118 when in the lowered position.

The example indicator 100 may further comprise a latch 116. The latch 116 may be coupled to or engaged with each of the arm 108 and the indicator plate 118. In some implementations, the latch 116 may be pivotally coupled to the media tray 102 such that the latch 116 may toggle or pivot relative to the media tray 102, between a latched position and a released position. In further implementations, the latch 116 may be biased towards the latched position. The latch 116 may be biased towards the latched position by a resilient bias member, such as a spring or torsion spring. In further implementations, the latch 116 may be biased towards the latched position by gravity and having, an unbalanced pivot point. The latch 116 may comprise a latch portion 124 to engage with the latch post 122 of the indicator plate 118, in some implementations. The latch portion 124 may include complementary geometry, such as a slot, shelf or channel, for example, to cradle or hold the latch post 122 in the latched position.

Referring, still to FIGS. 1C-D an example indicator is illustrated wherein the indicator plate 118 is disposed in the raised position. In such an implementation, the latch 116 may be disposed in the latched position, and therefore may support the indicator plate 118 in the raised position. The latch 116 may support the indicator plate 118 in the raised position by the latching portion 124 of the latch 11 engaging with the latch post 122 of the indicator plate 118 such that the latch post 122 fully rests upon the latching portion 124, and the latch 116 can, therefore, support the entire weight of the indicator plate 118.

Referring to FIG. 1D, the arm 108, in some implementations, may comprise a pivot tab 130 to engage with a pivot surface 132 of the latch 116. The pivot tab 130 may be a protrusion that extends laterally, or substantially orthogonally, from the longitudinal axis of the arm 108. The pivot tab 130 troy, in some implementations, be a unitary part of the arm 108, or, in other implementations, the pivot tab 130 may be a separate component that is assembled to the arm 108. The pivot tab 130 may be disposed on the second end 120 of the arm 108 and, thus, move with the second end 120 of the arm 108. For example, should the arm 108 rotate or pivot about the pivot 121 in a direction such as direction 126, the second end 120 may move in a downward direction, thus also lowering or moving the pivot tab 130 in a downward direction 128. The pivot tab 130 may be disposed along or spaced along the length of the arm 108 at an appropriate location such that, upon moving in a downward direction such as direction 128, the pivot tab 130 may contact the pivot surface 132 of the latch 116.

Figure 1E:
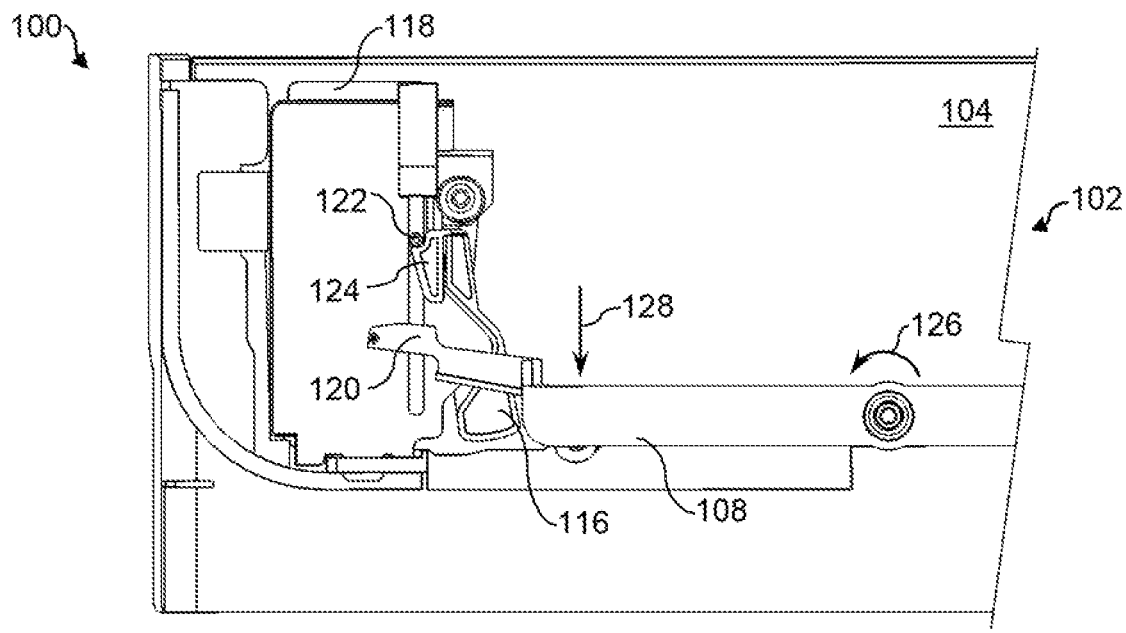
FIG. 1E is a partial back view of an example indicator.
Figure 1F:
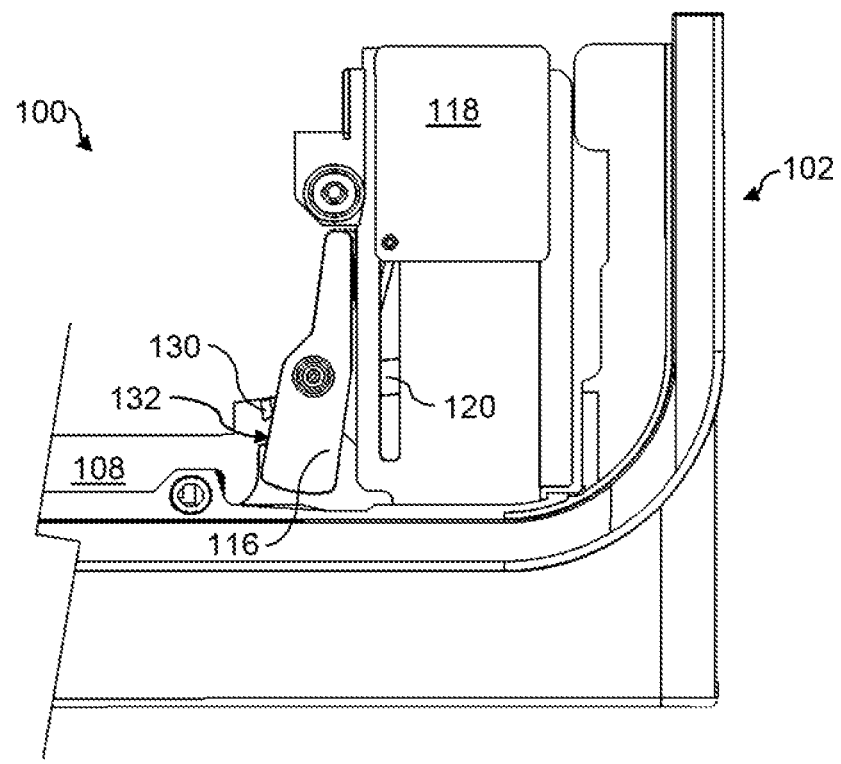
FIG. 1F is a partial front view of an example indicator.

Referring now to FIG. 1E, a partial back view of an example indicator 100 is illustrated. Referring additionally to FIG. 1F, a partial front view of the example indicator 100 is illustrated. In FIGS. 1E-F, an example indicator 100 is illustrated wherein the indicator plate 118 is still disposed in the raised position, and the arm 108 has rotated along direction 126. In some implementations, the first end 119 of the arm 108 may have moved in an upward direction as depicted in FIG. 1B, thereby causing the arm 108 to rotate along direction 126 and the second end of the arm 120 to move in a downward direction 128, the arm 108, and thus the pivot tab 130, has moved in the downward direction 128 to the point where the pivot tab 130 makes contact with the pivot surface 132 of the latch 116. The arm 108 may cause the latch 116 to start to pivot upon the pivot tab 130 coming into contact with the pivot surface 132 of the latch 116. As illustrated in FIGS. 1E-F, the latch 116 is still in the latched position and, therefore, still supports the indicator plate 118 in the raised position.

Figure 1G:
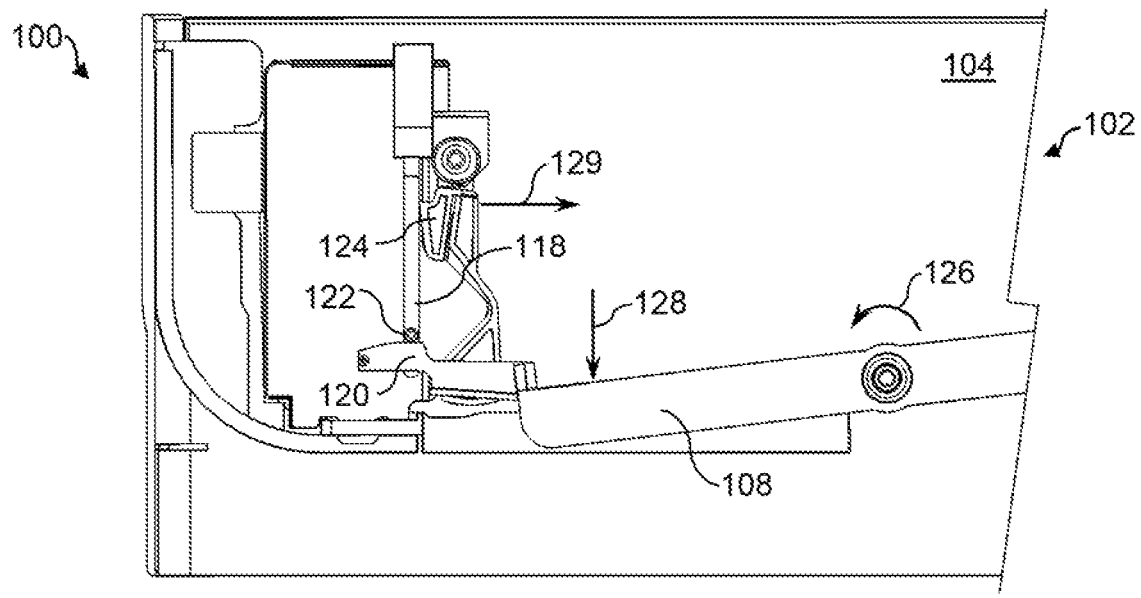
FIG. 1G is a partial back view of an example indicator.
Figure 1H:
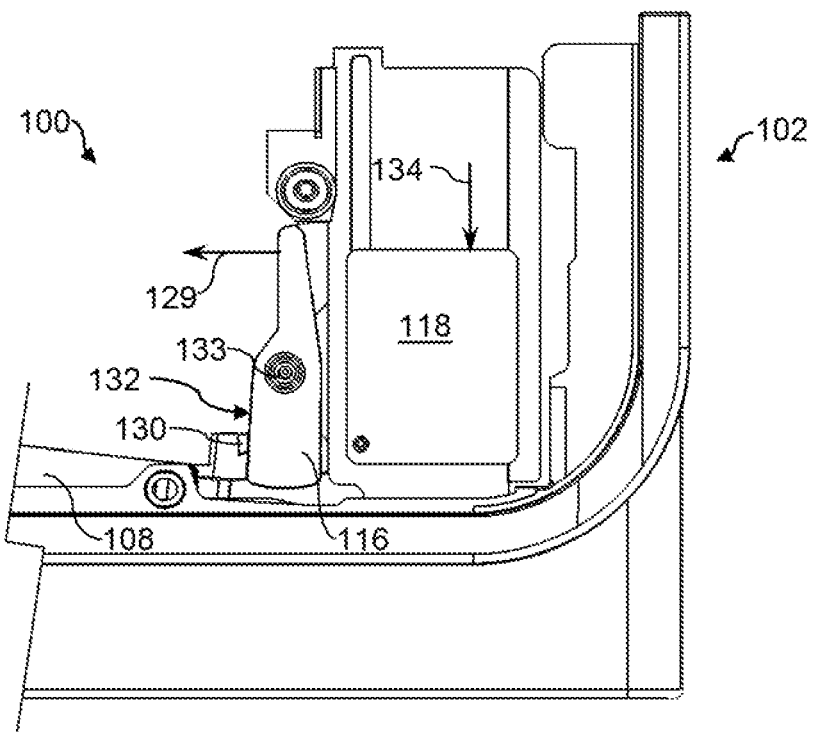
FIG. 1H is a partial front view of an example indicator.

Referring now to FIG. 1G, a partial back view of an example indicator 100 illustrated. Referring additionally to FIG. 1H, a partial front view of the example indicator 100 is illustrated. In FIGS. 1G-H, an example indicator 100 is illustrated wherein the arm 108 has continued to rotate along direction 126, the latch 116 has pivoted to the released position, and the indicator plate 118 has fallen or slid to the lowered position. The arm 108 may haw continued to rotate along direction 126 due to print media continuing to be removed from the media tray 102 and, therefore, causing the first end 119 of the arm 108 to continue to move in the upward direction. Further, the arm 108 may have moved along, the direction 126 far enough to cause the latch 116 to release the indicator plate 118 due to a certain, or specific quantity, or predetermined amount of print media remaining within the media tray 102. In other words, the second end 120 of the arm 108, and thus the pivot tab 130, has continued to move in the downward direction 128. The pivot tab 130, therefore, has pushed upon the pivot surface 132 of the latch 116 such that the latch 116 has pivoted about its pivot point 133. The pivot tab 130 has cawed the latch 116 to pivot such that the latch portion 124 has translated in a direction 129, away from the latch post 122 of the indicator plate 118. As illustrated in FIG. 1G-H, the pivot tab 130 has continued in the direction 128, pushing on pivot surface 132 so that the latch portion 124 has completely disengaged from the latch post 122. Upon disengagement of the latch post 122 with the latching portion 124, the latch 116 has fully pivoted from the latched position to the released position, and the indicator plate 118 is no longer supported in the raised position by the latch 116. Thus, the latch 116 has released the indicator plate 118 to slide in a direction 134 to the lowered position. Therefore, the indicator plate 118 may be supported in the raised position until a predetermined, or specific amount of print media 106 is removed from the media tray, thereby moving the arm 108 a sufficient amount to contact and pivot the latch 116 to a degree where the latch 116 releases the indicator plate 118.

Figure 1I:
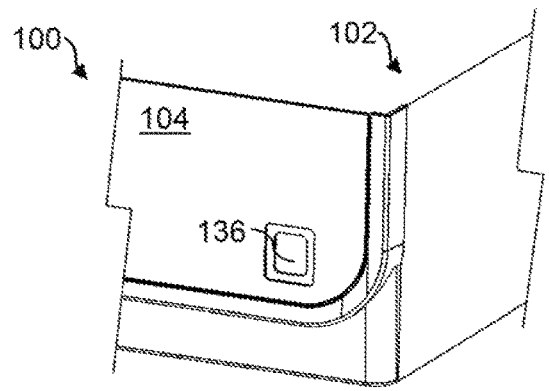
FIG. 1I a partial perspective front view of an example indicator.
Figure 1J:
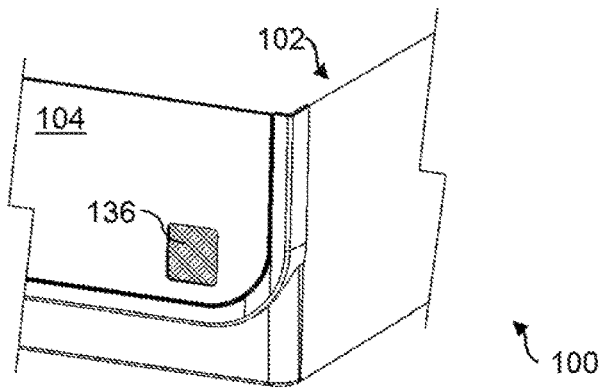
FIG. 1J is a partial perspective front view of an example indicator.

Referring now to FIGS. 1I-J, partial perspective views of an example indicator 100 disposed within a media tray 102 are illustrated. The media tray 102 may have an exterior panel 104 comprising an indicator window 136, in some implementations. The indicator plate 118 may be visible to the exterior of the media tray 102 or printing system through the window 136 when in the lowered position. Further, the indicator plate 118 may not be visible to the exterior of the media tray 102 or printing system through the indicator window 136 when in the raised position FIG. 1I may represent the situation illustrated in FIGS. C-F, where the indicator plate 118 is disposed in the raised position, supported by the latch 116. Further, FIG. 1J may represent the situation illustrated in FIGS. 1G-H, where the hitch 116 has pivoted from the latched position to the released position, and the indicator plate 118 has moved from the raised position to the lowered position. The indicator plate 118 may now be visible through the window 136 to an external user, signifying to the user that the predetermined, or specific amount of print media is remaining within the media tray 102, and that additional print media 106 should be added to the tray 102.

Figure 1K:
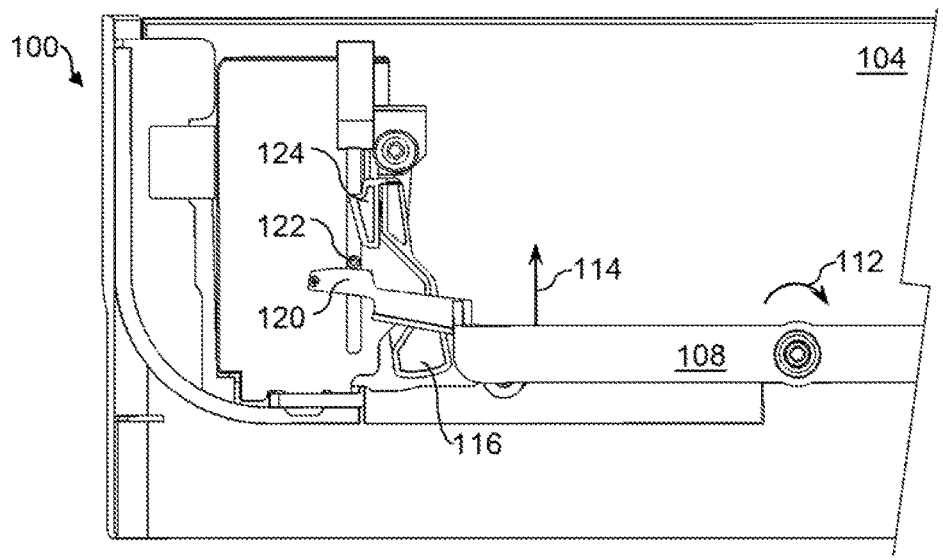
FIG. 1K is a partial back view of an example indicator.

Referring now to FIG. 1K, a partial back view of an example indicator 100 is illustrated, wherein the arm 108 has rotated along direction 112, after the indicator plate 118 has moved from the raised position to the lowered position. The arm 108 may rotate along direction 112 due to the first end 119 of the arm 108 moving in a downward direction, such as direction 110, for example. The first end 119 may move in a downward direction, in some implementations, due to additional print media 106 being disposed within or added to the media tray 102. In other words, after the print media 106 reaches the predetermined, or specific quantity or level, a user may refill the media tray 102, thereby moving the first end 119 of the arm 108 in a downward direction 110, and the second end 120 of the arm 108 in an upward direction, such as direction 114. The latch post 122 of the indicator plate 118 may be engaged with, or resting upon, in some implementations, a surface of the second end 120, such that, as the second end 120 moves in upward direction 114, the second end 120 pushes the latch post 122, and thus the indicator plate 118 upwards towards the raised position.

Figure 1L:
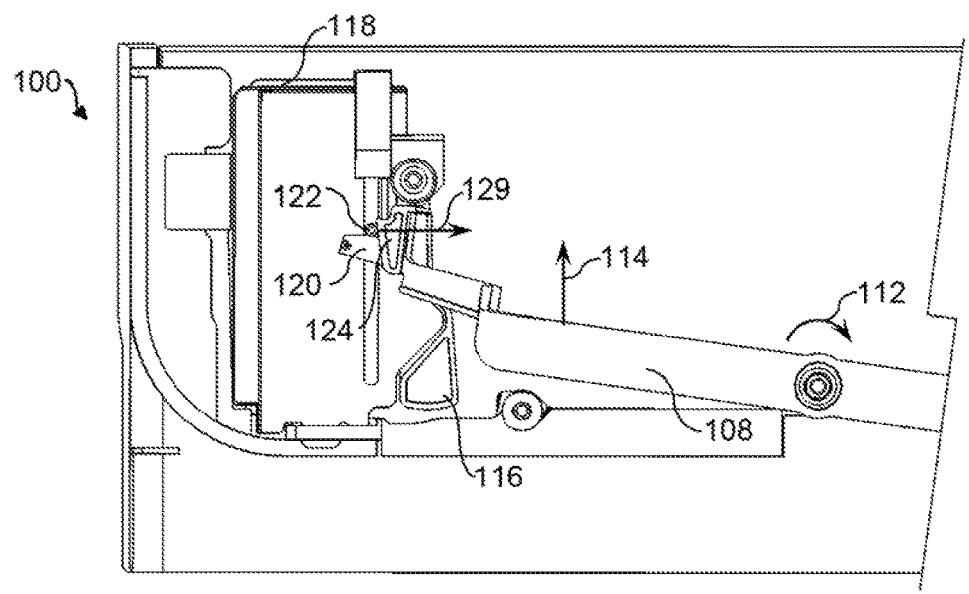
FIG. 1L is a partial back view of an example indicator.

Referring additionally to FIG. 1L, a partial back view of an example indicator 100 is illustrated, wherein the arm 108 has continued to rotate along direction 112, thereby pushing the latch post 122 in an upwards direction 114 so that the latch post 122 comes into contact with the latching portion 124 of the latch 116. The latch post 122 of the indicator plate 118 may contact and engage with a surface or feature of the latching portion 124 of the latch 116 such that the post 122 pushes the latching portion 124 in a lateral direction, such as direction 129, for example. As the arm 108 continues to push the latch post 122 along an upward direction, the latch post 122 may continue to push the latching portion 124 along the lateral direction such that the latch 116 pivots from the latched position back to the released position. Once the latch 116 reaches the released position, the latch post 122 may continue moving in the upward direction until it has moved beyond and stopped contact with the surface or feature of the latching portion 124. In some implementations, the latch post 122 may stop contact with the latching portion 124 once the indicator plate 118 is back in the raised position. Additionally, the latch post 122, in some implementations, may stop contact with the hitching portion 124 upon a predetermined amount or quantity of print media 106 being loaded into the media tray 102. At this point, the latch 116 may, once again, pivot from the released position back to the latched position due to the latch 116 being biased in the latched direction. Once in the latched position, the latch post 122 may, again, be engaged with the latching portion 124 so that the latch 116 supports the indicator plate 118 in the raised position, as illustrated in FIGS. 1C-D. In other words, upon receiving a refill or another predetermined quantity of print media 106, the arm 108 may push the indicator plate 118 back up to the raised position, where the latch post 122 may pivot the latch 116 from the latched position to the released position so that the latch post 122 may move past the latching portion 124 of the latch 116, and wherein the latch 116 may then pivot back to the latched position to support the indicator plate 118 in the raised position.

Figures 2A, 2B:
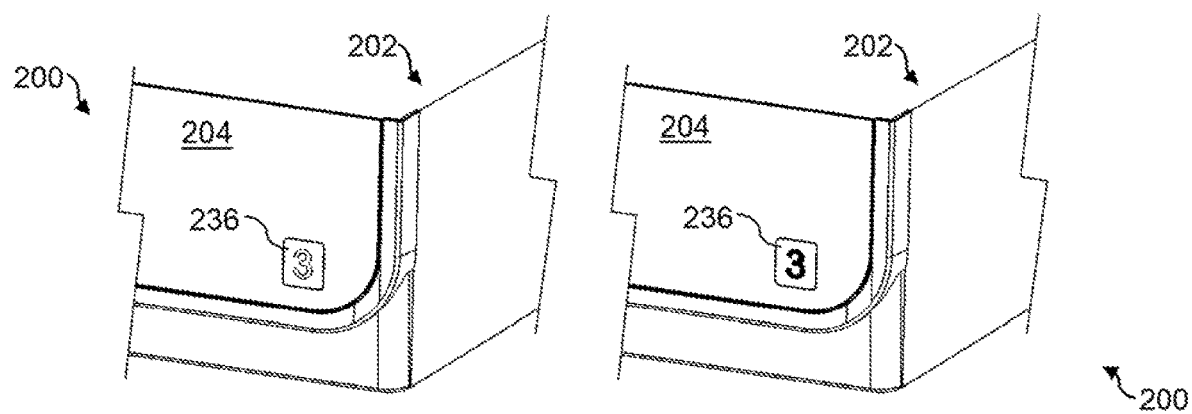
FIG. 2A is a partial perspective front view of an example indicator.
FIG. 2B is a partial perspective front view of an example indicator.

Referring now to FIGS. 2A-B, partial perspective views of an example indicator 200 disposed within a media tray 202 are illustrated. Example indicator 200 may be similar to example indicator 100. Further, the similarly named elements of example indicator 200 may be similar in function and/or structure to the elements of example indicator 100, as they are described above. The media tray 202 may have an exterior panel 204 comprising an indicator window 236, in some implementations. In further implementations, the indicator window 236 may comprise the shape of a symbol or character to identify the media tray 202 and differentiate the media tray 202 from other media trays disposed within the same printing system. In yet further implementations, the indicator window 236 may comprise the shape of an alphanumeric character, such as a letter or number in order to identify the medic tray 202. Additionally, an indicator plate may be visible to the exterior of the media tray 202 when the indicator plate is in a lowered position, which may be behind the indicator window 236. Further, the indicator plate may be disposed behind the indicator window 236 when in the lowered position such that the character or symbol is visible to the exterior of the media tray 202.

What is claimed is:

1. An indicator, comprising:
an arm pivotally disposed within a media tray, wherein the media tray is to receive print media;
an indicator plate movably coupled to the media tray; and
a latch engaged with the arm and the indicator plate,
the arm to lower a pivot tab of the arm towards a pivot surface of the latch upon print media being removed from the media tray, and
the latch to support the indicator plate in a raised position, and to release the indicator plate to a lowered position upon the arm pivoting the latch from a latched position to a released position.

2. The indicator of claim 1, wherein the indicator plate is visible from the exterior of the media tray when in the lowered position, and wherein the indicator plate is not visible from the exterior of the media tray when in the raised position.

3. The indicator of claim 1, wherein the arm is to start to pivot the latch upon the pivot tab coming into contact with the pivot surface of the latch, and wherein the latch is to further pivot towards the released position upon the pivot tab further pushing on the pivot surface.

4. The indicator of claim 1, wherein the latch is to reach the released position upon the level of print media disposed within the media tray reaching a specific level.

5. The indicator of claim 1, further comprising:
a lift plate disposed within the media tray to pivot a first end of the arm in a downward direction upon receiving print media, and a second end of the arm in an upward direction to raise the indicator plate to the raised position,
wherein, upon the indicator plate reaching the raised position, the latch is to pivot to the latched position to support the indicator plate in the raised position.

6. An indicator, comprising:
an arm pivotally engaged with a lift plate to support print media within a media tray;
an indicator plate movably coupled to the media tray; and
a latch to support the indicator plate in a raised position and pivotally coupled with the arm,
wherein the lift plate is to pivot a first end of the arm in an upward direction and a second end of the arm in a downward direction upon print media being removed from the lift plate, and
wherein the latch is to release the indicator plate to a lowered position upon the second end of the arm pivoting the latch from a latched position to a released position.

7. The indicator of claim 6, wherein the arm is to start to pivot the latch from the latched position to the released position upon the second end of the arm moving in the downward direction and coming into contact with the latch, and wherein the latch is to further pivot towards the released position upon the second end further moving in the downward direction.

8. The indicator of claim 7, wherein the indicator plate is visible from the exterior of the media tray when in the lowered position.

9. The indicator of claim 8, wherein the latch is to pivot towards the latched position upon the second end of the arm moving in an upward direction while in contact with the latch.

10. A media tray, comprising:
an exterior panel including an indicator window;
a lift plate to receive and support print media; and
a indicator, comprising:
an arm having a first end and a second end, and pivotally engaged with the lift plate such that the lift plate is to pivot the first end of the arm in a downward direction upon the lift plate receiving print media, and in an upward direction upon having print media removed from the lift plate;
an indicator plate movably coupled to the exterior panel; and
a latch pivotally engaged with the arm and to support the indicator plate in a raised position, and to release the indicator plate to a lowered position upon the second end of the arm pivoting the latch from a latched position to a released position,
wherein the indicator plate is visible through the indicator window when the indicator plate is in the lowered position.

11. The indicator of claim 10, wherein the second end of the arm is to move in a downward direction upon the first end moving in the upward direction, and the second end is to move in an upward direction upon the first end moving in the downward direction.

12. The indicator of claim 11, wherein the second end of the arm is to pivot the latch from the latched position to the released position upon a specific amount of print media being removed from the lift plate.

13. The indicator of claim 12, wherein the second end of the arm is to raise the indicator plate to the raised position upon the lift plate receiving a specific amount of print media, whereupon the latch is to pivot to the latched position to support the indicator plate in the raised position.

14. The indicator of claim 13, wherein the indicator window comprises the shape of an alphanumeric character such that the alphanumeric character is visible to the exterior of the media tray when the indicator plate is in the lowered position.

* * * * *